United States Patent
Gaitonde et al.

(10) Patent No.: US 7,594,212 B1
(45) Date of Patent: Sep. 22, 2009

(54) AUTOMATIC PIN PLACEMENT FOR INTEGRATED CIRCUITS TO AID CIRCUIT BOARD DESIGN

(75) Inventors: Dinesh D. Gaitonde, Fremont, CA (US); Salil Ravindra Raje, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 225 days.

(21) Appl. No.: 11/888,162

(22) Filed: Jul. 31, 2007

(51) Int. Cl.
*G06F 17/50* (2006.01)

(52) U.S. Cl. .................................. 716/9; 716/2; 716/16

(58) Field of Classification Search ........................ None
See application file for complete search history.

(56) References Cited

U.S. PATENT DOCUMENTS

| | | | |
|---|---|---|---|
| 5,544,088 A * | 8/1996 | Aubertine et al. ............. | 716/13 |
| 5,790,882 A | 8/1998 | Silver et al. | |
| 6,654,941 B1 * | 11/2003 | Baumbach .................... | 716/10 |
| 6,948,138 B1 * | 9/2005 | Shen ............................. | 716/2 |
| 7,058,915 B1 | 6/2006 | Singh et al. | |
| 7,111,265 B1 * | 9/2006 | Tan et al. ....................... | 716/10 |
| 7,451,422 B1 * | 11/2008 | Slonim et al. ................. | 716/16 |
| 7,480,884 B1 * | 1/2009 | Slonim et al. ................. | 716/10 |
| 2008/0109780 A1 * | 5/2008 | Stern et al. .................... | 716/11 |

\* cited by examiner

*Primary Examiner*—Leigh Marie Garbowski
(74) *Attorney, Agent, or Firm*—Kevin T. Cuenot; Lois D. Cartier

(57) ABSTRACT

A computer-implemented method of placing input/output (I/O) pins of a circuit design for an integrated circuit (IC) can include selecting a bus from a plurality of buses, where the selected bus includes a plurality of I/O pins and is part of an interface, and, for each of a plurality of banks of the IC, determining a cost of assigning the selected bus to the bank according, at least in part, to a measure of proximity of the bank to another bank including a bus of the interface. The method can include selecting an available bank having a lowest cost, assigning at least one of the plurality of I/O pins of the selected bus not assigned to a bank of the IC to the selected bank, and outputting a circuit design including an association of I/O pin(s) of the selected bus to the selected bank.

20 Claims, 2 Drawing Sheets

US 7,594,212 B1

AUTOMATIC PIN PLACEMENT FOR INTEGRATED CIRCUITS TO AID CIRCUIT BOARD DESIGN

FIELD OF THE INVENTION

The invention relates to integrated circuit devices (ICs). More particularly, the invention relates to placing input/output pins of a circuit design for an IC.

BACKGROUND

Circuit designs to be implemented within integrated circuit devices (ICs) are typically expressed in programmatic form. For example, a circuit design can be expressed as a netlist, as one or more hardware description language files, or the like. The circuit design can specify, or include, a plurality of input/output (I/O) pins in conjunction with logic and other circuit structures. Each I/O pin references a node within the circuit design that will either send a signal from the IC to a destination external to the IC or receive a signal into the IC from a source that is external to the IC.

In order to communicate signals to or from the IC, each I/O pin must be assigned, or mapped, to a physical pin on the packaging of the IC. Physical pins on the packaging of the IC, also referred to as package pins, typically are grouped into one or more banks. Once an I/O pin is mapped or assigned to a particular package pin, the I/O pin can be routed or connected to the assigned package pin.

I/O pins can be mapped to package pins through a manual process or through an automated process. Modern ICs, including programmable logic devices (PLDs), can include a significant number of package pins. A field programmable gate array type of PLD, for example, can include hundreds of package pins. In light of the size and complexity of modern ICs, it can be appreciated that manually mapping I/O pins to package pins can be a difficult and tedious process. This is particularly true as various constraints must be observed. For example, it is usually the case that each bank of package pins of the IC may include only I/O pins of a same I/O standard.

Automated mapping of I/O pins to package pins can be performed by an electronic design automation (EDA) tool. An EDA tool can determine a placement for the I/O pins that will conform to established constraints, e.g., that the package pins of a same bank may only be assigned to I/O pins of a same I/O standard. Automated mapping techniques, however, disregard aspects of system design that are external to the IC itself. For example, while an automatic pin placement technique will ensure that I/O standard constraints are observed, the technique will not take into consideration circuit board layout or any other factors unrelated to the internal workings and architecture of the IC when mapping I/O pins to package pins.

SUMMARY

The embodiments disclosed herein relate to placing pins of a circuit design for an integrated circuit (IC). One embodiment of the present invention can include a computer-implemented method of placing input/output (I/O) pins of a circuit design for an IC. The method can include selecting a bus from a plurality of buses of the circuit design, wherein the selected bus includes a plurality of I/O pins and is part of an interface, and, for each of a plurality of banks of the IC, determining a cost of assigning the selected bus to the bank according, at least in part, to a measure of proximity of the bank to at least one other bank including a bus of the interface. The method can include selecting an available bank having a lowest cost, assigning at least one of the plurality of I/O pins of the selected bus that is not assigned to a bank of the IC to the selected bank, and outputting a circuit design including an association of at least one I/O pin of the selected bus to the selected bank.

Determining the cost can include calculating a distance between the bank and the at least one other bank including a bus of the interface. In another embodiment, determining the cost can include determining the cost according, at least in part, to a measure of proximity of the bank to at least one other bank including an I/O pin of the selected bus. In that case, a distance between the bank and the at least one other bank including an I/O pin of the selected bus can be calculated. In another embodiment, determining the cost can include determining the cost according, at least in part, to a measure of available package pins of the bank compared to unassigned I/O pins of the selected bus.

When a number of available package pins of the selected bank is less than a number of unassigned I/O pins of the selected bus, the method can include selecting at least one further bank according, at least in part, to a measure of proximity of the at least one further bank to the selected bank and assigning at least one unassigned I/O pin of the selected bus to the at least one further bank.

In another embodiment, when a number of available package pins of the selected bank is less than a number of unassigned I/O pins of the selected bus, the method can include selecting at least one further bank having a number of available package pins that is greater than or equal to a number of unassigned I/O pins of the selected bus and assigning at least one unassigned I/O pin of the selected bus to the at least one further bank. Alternatively, selecting at least one further bank can include selecting at least one further bank having a smallest number of available package pins that is greater than or equal to a number of unassigned I/O pins of the selected bus.

Another embodiment of the present invention can include a computer-implemented method of placing I/O pins of a circuit design for an IC, the method including selecting a bus from a plurality of buses of the circuit design, wherein the selected bus includes a plurality of I/O pins and is part of an interface, and, for each of a plurality of banks of the IC, determining a cost of assigning the selected bus to the bank according, at least in part, to a measure of proximity of the bank to at least one other bank including an I/O pin of the selected bus. The method further can include selecting an available bank having a lowest cost, assigning at least one of the plurality of I/O pins of the selected bus that is not assigned to a bank of the IC to the selected bank, and outputting a circuit design including an association of at least one I/O pin of the selected bus to the selected bank.

Determining the cost can include calculating a distance between the bank and the at least one other bank including an I/O pin of the selected bus. In another embodiment, determining the cost can include determining the cost according, at least in part, to a measure of proximity of the bank to at least one other bank including a bus of the interface. In that case, determining the cost can include calculating a distance between the bank and the at least one other bank including a bus of the interface. In another embodiment, determining the cost can include determining the cost according, at least in part, to a measure of available package pins of the bank compared to unassigned I/O pins of the selected bus.

When a number of available package pins of the selected bank is less than a number of unassigned I/O pins of the selected bus, the method can include selecting at least one further bank according, at least in part, to a measure of proximity of the at least one further bank to the selected bank, and assigning at least one unassigned I/O pin of the selected bus to the at least one further bank.

In another embodiment, when a number of available package pins of the selected bank is less than a number of unassigned I/O pins of the selected bus, the method can include selecting at least one further bank having a number of available package pins that is greater than or equal to the number of unassigned I/O pins of the selected bus, and assigning at least one unassigned I/O pin of the selected bus to the at least one further bank. In another embodiment, the selection of at least one further bank can include selecting at least one further bank having a smallest number of available package pins that is greater than or equal to a number of unassigned I/O pins of the selected bus.

Another embodiment of the present invention can include a computer program product including a computer-usable medium having computer-usable program code that places I/O pins of a circuit design for an IC. The computer-usable medium can include computer-usable program code that selects a bus from a plurality of buses of the circuit design, wherein the selected bus includes a plurality of I/O pins and is part of an interface. The computer-usable medium can include computer-usable program code that, for each of a plurality of banks of the IC, determines a cost of assigning the selected bus to the bank according, at least in part, to at least one of a measure of proximity of the bank to at least one other bank including a bus of the interface or a measure of proximity of the bank to at least one other bank including an I/O pin of the selected bus.

The computer-usable medium further can include computer-usable program code that selects an available bank having a lowest cost and computer-usable program code that assigns at least one of the plurality of I/O pins of the selected bus that is not assigned to a bank of the IC to the selected bank. Computer-usable program code that outputs a circuit design including an association of at least one I/O pin of the selected bus to the selected bank also can be included.

The computer-usable program code that determines the cost further can include computer-usable program code that determines the cost according, at least in part, to a measure of available package pins of the bank compared to unassigned I/O pins of the selected bus.

When a number of available package pins of the selected bank is less than a number of unassigned I/O pins of the selected bus, the computer-usable medium can include computer-usable program code that selects at least one further bank having a number of available package pins that is greater than or equal to the number of unassigned I/O pins of the selected bus, and computer-usable program code that assigns at least one unassigned I/O pin of the selected bus to the at least one further bank.

In another embodiment, when a number of available package pins of the selected bank is less than a number of unassigned I/O pins of the selected bus, the computer-usable medium can include computer-usable program code that selects at least one further bank having a smallest number of available package pins that is greater than or equal to a number of unassigned I/O pins of the selected bus, and computer-usable program code that assigns at least one unassigned I/O pin of the selected bus to the at least one further bank.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the invention.

The embodiments disclosed herein relate to pin placement on an integrated circuit (IC). Input/output (I/O) pins defined within a programmatic circuit description for an IC can be mapped to package pins of the IC in a manner that seeks to keep I/O pins of a same interface and/or bus proximate to one another. The I/O pins of a same interface and/or bus of the circuit design can be mapped to package pins that are proximate to one another. By placing I/O pins in this manner, design of the circuit board upon which the IC will be mounted or disposed can be simplified, because signals of a particular interface and/or bus will not be spread to package pins across the IC.

As used herein, an "I/O pin" can be a node defined within a programmatic circuit description. An I/O pin can represent a node of the circuit design that provides a signal as output to a destination that is external to the IC within which the circuit design is to be implemented or that receives a signal from a source that is external to the IC within which the circuit design is to be implemented. A "package pin," as used herein, can refer to a physical pin that is mounted or coupled to the packaging of the IC and which can be communicatively coupled, e.g., electrically, to an I/O pin of the circuit design implemented within the IC. The package pin, for example, makes physical and/or electrical contact with the board upon which the IC is to be located or mounted. To function properly, I/O pins must be mapped or assigned to package pins.

Figure 1:
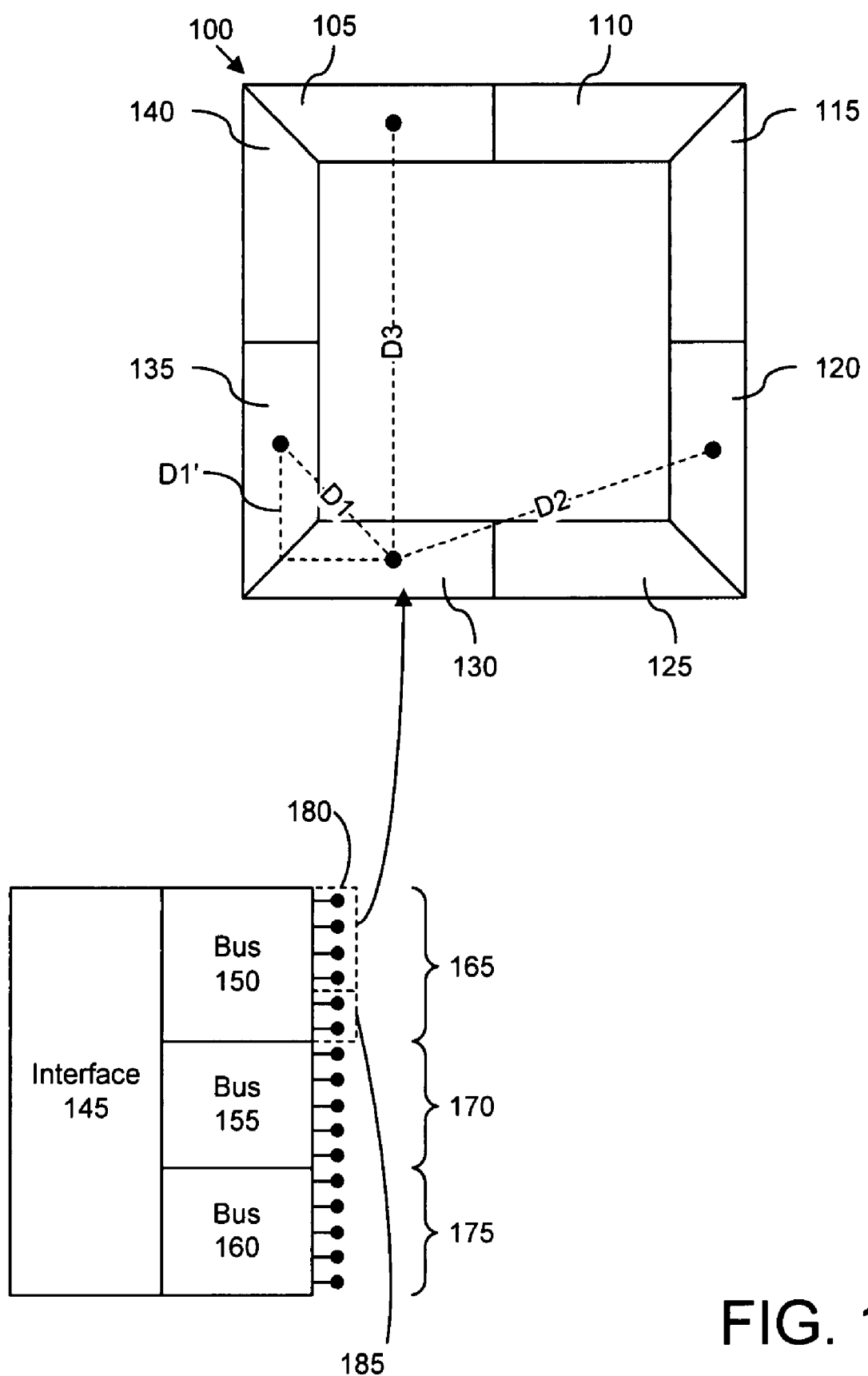
FIG. 1 is a block diagram illustrating placement of input/output (I/O) pins of a circuit design to banks of an integrated circuit (IC) in accordance with one embodiment of the present invention.

FIG. 1 is a block diagram illustrating placement of I/O pins of a circuit design to banks of an IC in accordance with one embodiment of the present invention. FIG. 1 illustrates a technique for placing I/O pins of an interface 145 to banks of an IC 100. In one embodiment, the IC 100 can be implemented as a programmable logic device (PLD) such as a field programmable gate array (FPGA) type of PLD. The IC 100 can include a plurality of banks 105, 110, 115, 120, 125, 130, 135, and 140. Each bank 105-140 can include a plurality of package pins. I/O pins of a circuit design must be mapped to particular banks of the IC as well as to particular package pins within those banks. It should be appreciated that IC 100 represents the physical packaging within which the actual IC is disposed.

The interface 145 can be included as part of, or specified within, a circuit design that is to be implemented within the IC 100. The interface 145 can be one of a plurality of interfaces defined by a programmatic description of the circuit design to be processed by a software-based, electronic design automation (EDA) tool. The interface can include one or more buses such as buses 150, 155, and 160. Each of buses 150, 155, and 160 can include one or more I/O pins. As shown, bus 150 can include I/O pins 165. Bus 155 can include I/O pins 170; and bus 160 can include I/O pins 175.

As is well known, an EDA tool generally processes a programmatic description of a circuit design through an implementation flow. Processing the circuit design through an implementation flow prepares the circuit design for implementation within a particular IC, e.g., the "target IC." A typical implementation flow can include various tasks such as synthesis, technology mapping, placing, and routing. Pin placement, as described herein, also can be performed, whether by the EDA tool or a component of an EDA tool or other development environment. In the case of an FPGA, for example, the resulting circuit design can be transformed and output as a bitstream that, when loaded into the target IC, configures the target IC to implement the circuit design. As used herein, "outputting" can include, but is not limited to, writing to a file, writing to a user display or other output device, playing audible notifications, sending or transmitting to another system, exporting, or the like.

An example of an interface can be a double data rate (DDR) interface for a random access memory (RAM). If an IC is to communicate with a static RAM (SRAM), for example, a DDR interface is needed. An interface, such as a DDR interface, can be viewed as a collection of buses. Each bus can include one or more signals, where each signal corresponds to an I/O pin. Another example of an interface can be a peripheral component interconnect (PCI) interface. Including a given interface within a circuit design typically means that the circuit design is to include a plurality of buses of various signals conforming to specific I/O standards.

In general, each bus can be associated with a particular I/O standard. An "I/O standard" generally defines a set of properties or attributes that any I/O pin must possess if considered to conform to, or "be of", that I/O standard. Examples of common I/O standards can include, but are not limited to, LVCMOS25, LVDS25, PCI33_3, GTL, GTL_DCI, GTLP_DCI, HSTL_I_D, LVDCI_18, and LVDCI_33. This listing is not intended to be exhaustive, but rather to serve as an illustration of the many different I/O standards that are available that dictate the parameters ascribed to an I/O pin. An exemplary set of attributes defining an I/O standard can include, but is not limited to, the I/O standard name, the reference voltage, the output voltage, the termination type (split, single, driver, none), and the direction type (input, output, bidirectional).

In accordance with the embodiments disclosed herein, interfaces of a circuit design can be assigned to banks of an IC in a manner that places a priority on keeping I/O pins of the interface proximate to one another. Doing so facilitates improved board design, as I/O pins of a same interface and/or bus are generally routed to a same location or region on the circuit board. Were such signals to be distributed randomly across package pins of the IC, circuit board layout may be unduly complicated.

In illustration, consider the case where I/O pins 180 of bus 150 are assigned to bank 130, as shown in FIG. 1. If there is no further room, e.g., no further available package pins, within bank 130 to which the remaining pins 185 of bus 150 may be assigned or placed, another bank must be selected. Conventional EDA tools place such pins using various metrics relating to the IC itself, without regard to proximity of I/O pins of a same bus and/or interface. In accordance with the embodiments disclosed herein, a cost function can be employed that accounts for various metrics that affect aspects of a system that are external to the IC 100. Such metrics can include, but are not limited to, proximity of I/O pins of a same interface, proximity of I/O pins of a same bus, and/or the ability of a given bank of the IC to accommodate as many, if not all, of the I/O pins of a particular bus, and/or any combination thereof. Proximity can refer to the proximity, e.g., distance, as measured or determined with respect to the physical packaging of the target IC, as illustrated in FIG. 1.

When placing I/O pins 185 of bus 150, an EDA tool configured in accordance with the embodiments disclosed herein can evaluate various aspects of the available banks of the IC 100. Such metrics can be accounted for within a cost function so that a cost of assigning I/O pins of a given interface and/or bus to a bank can be calculated for each bank. A bank with a lowest cost, with respect to a given set of I/O pins can be selected as the bank to which the I/O pins will be placed.

For example, one such metric can be proximity. If pins 180 are placed into bank 130 and only banks 105, 120, and 135 are available, it can be seen that of the available banks, bank 135 is the closest to bank 130. In other words, distance D1 is less than distance D2 or distance D3. Accounting for distance in this manner can aid in placing pins of a same bus, e.g., bus 150, to package pins that are proximate to one another. Other metrics can be accounted for within a cost function and will be described herein in greater detail with reference to FIG. 2. In another embodiment, distances can be measured around the perimeter of the IC 100. For example, distance D1' can represent this alternate measurement technique.

It should be appreciated that FIG. 1 is provided for purposes of illustration only and, as such, is not intended to limit the embodiments disclosed herein. For example, the interface 145 pictured in FIG. 1 is a visual representation of a programmatically specified interface within a circuit design. An interface may have more or fewer buses than depicted. A bus may have more or fewer I/O pins than depicted. An IC may have more or fewer banks than pictured. Distances, though depicted as being measured from a center point of each bank, can be measured from a perimeter, or other location of a bank. The distances need not, but would more reliably reflect accurate measurements, if taken from similar starting and ending points, e.g., a center of one bank to a center of another bank, a middle of an inner edge of one bank to a middle of an inner edge of another bank, a middle of an outer edge of one bank to a middle of an outer edge of another bank, or the like.

It further should be appreciated that the embodiments disclosed herein can be applied in addition to other constraints relating to the architecture of the target IC that may affect pin placement. That is, the embodiments disclosed herein are not intended to supersede other constraints that must be observed. In illustration, while the metrics discussed herein can be applied, it is assumed that constraints relating to placing I/O pins of a same I/O standard within a same bank will be observed. In this regard, if I/O pins may be assigned to a bank without violating I/O standard constraints, the bank can be said to be an "available bank." An available bank further must include at least one available, e.g., unmapped, package pin to which an I/O pin may be assigned, as will be discussed herein in greater detail.

Figure 2:
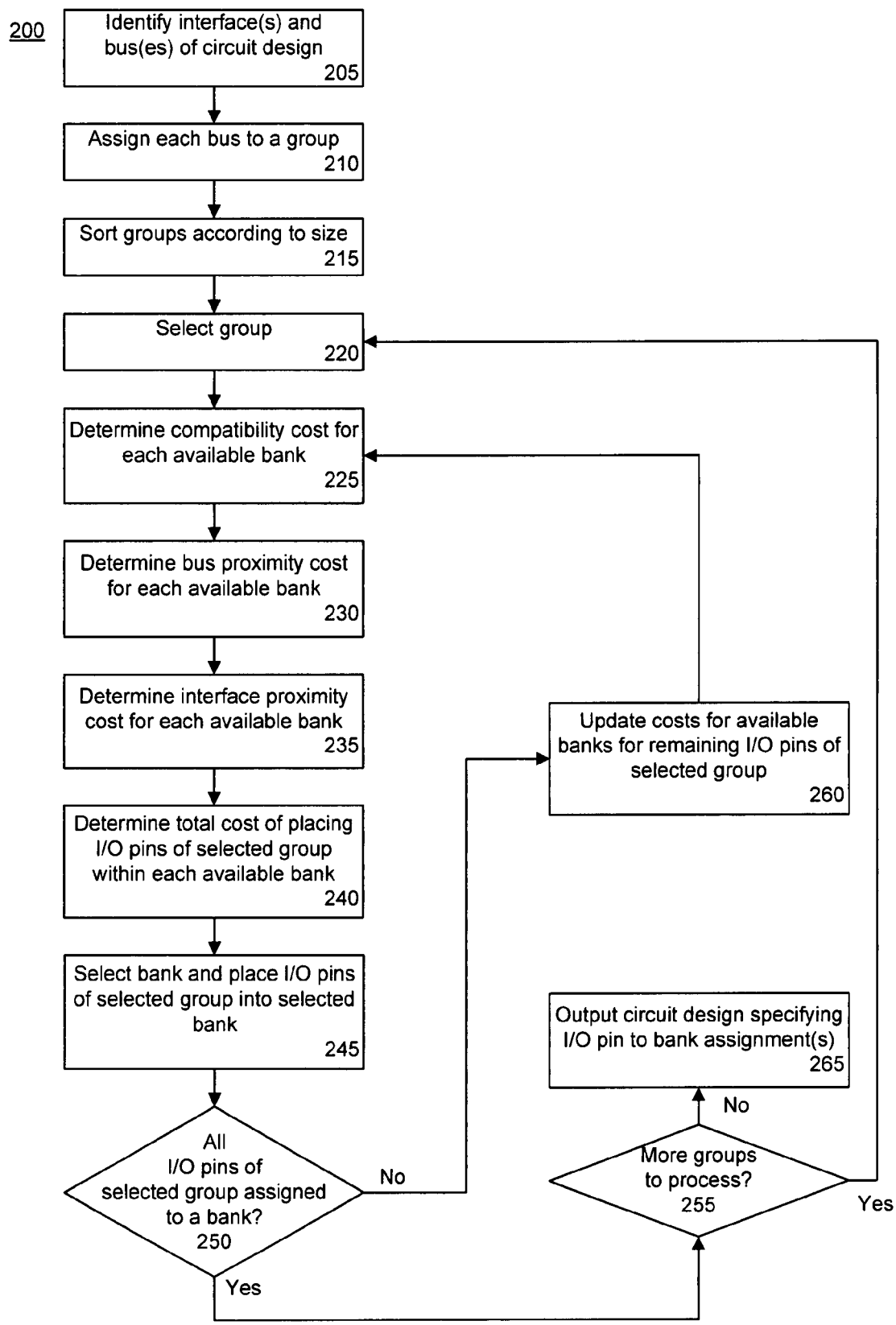
FIG. 2 is a flow chart illustrating a method of placing I/O pins to banks of an IC in accordance with another embodiment of the present invention.

FIG. 2 is a flow chart illustrating a method 200 of placing I/O pins to banks of an IC in accordance with another embodiment of the present invention. The method 200 can be implemented within, or as part of, an EDA tool to perform the various functions described herein. The method 200 can begin in a state in which a circuit design has been loaded into the EDA tool and I/O pins of the circuit design are to be mapped to banks and/or package pins of the target IC.

The method can begin in step 205, where interface(s) and bus(es) of the circuit design can be identified by the EDA tool. In identifying such structures, the EDA tool further can identify which buses, as well as which scalar signals, e.g., individual signals, are associated with, or belong to, which interfaces. In this manner, interface hierarchy can be determined, where each bus belongs to a single interface, and each I/O pin, unless a scalar signal, belongs to a particular bus. Each I/O pin can belong to a particular interface. In step 210, each bus can be assigned to a group. The I/O pins of each bus can be assigned to a single group, where a one-to-one relationship, at least initially, can be established between buses and groups. A group can serve as a proxy for unassigned I/O pins of the associated bus.

In step 215, the groups can be sorted according to size. In step 220, a group can be selected. In one embodiment, a group having the most I/O pins can be selected. Generally, the more I/O pins a group has, the more difficult placement of that group is expected to be. Selecting the group having the largest number of I/O pins allows more problematic groups and/or buses to be placed earlier in the pin placement task when more banks are available.

Having selected a particular group of the circuit design, e.g., the "selected group," the EDA tool can begin to calculate the cost associated with each available bank. An "available bank," as used herein, can refer to a bank of the IC that has one or more package pins available for mapping with respect to I/O pins. For example, as I/O pins become assigned to particular banks, such banks may become unavailable as the bank at some point may not have any available, or unassigned, package pins. In other cases, selected package pins of a bank may be reserved by a circuit designer for particular purposes and, thus, be unavailable for use during the pin placement task. As noted, an available bank also is a bank that conforms to other physical constraints that may exist within the IC.

In step 225, a compatibility cost for each bank can be determined with respect to the selected group. The compatibility cost of a bank can serve as an indication of the number of available package pins in the bank compared to the number of I/O pins of the selected group. For example, if a bank has a number of package pins that is greater than or equal to the number of I/O pins of the selected group, the compatibility cost of the bank will be zero. The number of I/O pins of a group corresponds to the number of unplaced, or unassigned, I/O pins of a bus.

As the number of I/O pins of the group that can be accommodated by the bank decreases, the compatibility cost of a bank can increase. In one embodiment, the increase can be a directly proportional relationship, e.g., increasing linearly per I/O pin that cannot be accommodated within the bank. For example, when the number of package pins available in the bank is less than the number of I/O pins of the group, the cost can be determined according to [(I/O pins of group)−(package pins of bank)]*SF, where SF represents a scaling or weighting factor. The scaling factor can be less than one, equal to one, greater than one, but in any case greater than zero. In another embodiment, the increase in cost as available package pins decrease can be a nonlinear function.

It should be appreciated that while a group initially will include the same number of I/O pins as the bus assigned to that group, as the pin placement task continues and one or more I/O pins of the bus are assigned to package pins, the group will correspondingly have fewer and fewer I/O pins, e.g., remaining I/O pins. As I/O pins of a bus are assigned to banks, such pins are no longer considered to be part of the group to which the bus has been assigned.

In step 230, a bus proximity cost can be determined with respect to the selected group. The bus proximity cost of a bank reflects the proximity of a bank to other banks that include one or more I/O pins of the current bus, e.g., the bus associated with the selected group. In cases where an entire bus can be assigned to a single bank, the bus proximity cost of that bank will be zero. The bus proximity cost will be nonzero in cases where a bus cannot be assigned to a single bank. The bus proximity cost places emphasis on mapping I/O pins of a same bus to package pins that are close together, e.g., within a same bank or within two or more banks that are close to one another.

The bus proximity cost can be determined according to a distance measurement from the subject bank, e.g., the bank for which a cost is being calculated, to another bank that includes I/O pins of the bus being placed. For example, consider the case where a bus proximity cost is being calculated for two available banks A and B for a bus 1. Bus 1 may already have I/O pins assigned to bank C and bank D. When considering bank A, the distance between bank A and bank C, denoted as $D_{AC}$, can be determined, as well as the distance between bank A and bank D, denoted as $D_{AD}$. The bus proximity cost of placing additional I/O pins of bus 1 to bank A will be dependent, in part, upon the sum $D_{AC}+D_{AD}$. Similarly, considering bank B, the bus proximity cost of bank B can be calculated as $D_{BC}+D_{BD}$, where $D_{BC}$ indicates the distance between bank B and bank C and $D_{BD}$ indicates the distance between bank B and bank D. The bus proximity cost can be scaled using a scaling factor as discussed, and/or processed in a nonlinear fashion if so desired.

In step 235, an interface proximity cost can be determined with respect to the selected group. The interface proximity cost of a bank reflects the proximity of the current bus, e.g., the bus associated with the selected group, to other buses of the same interface as the current bus. In cases where an entire interface, e.g., each bus of the interface, can be assigned to a single bank, the interface proximity cost of that bank will be zero. The interface proximity cost will be nonzero in cases where an entire interface cannot be assigned to a single bank. The interface proximity cost places emphasis upon mapping I/O pins of a same interface to package pins that are close together, e.g., within a same bank or within two or more banks that are close to one another.

The interface proximity cost can be determined according to a distance measurement taken from the subject bank, e.g., the bank for which a cost is being calculated, to another bank that includes I/O pins belonging to the interface to which the current bus belongs. For example, consider the case where an interface proximity cost is being calculated for two available banks A and B for a given interface. The interface may already have I/O pins, portions of a bus, or entire buses assigned to bank C and bank D. When considering bank A, the distance between bank A and bank C, denoted as $D_{AC}$, can be determined, as well as the distance between bank A and bank D, denoted as $D_{AD}$. The interface proximity cost of placing additional I/O pins of the interface to bank A will be dependent upon the sum $D_{AC}+D_{AD}$. Similarly, considering bank B, the interface proximity cost of bank B can be calculated as $D_{BC}+D_{BD}$, where $D_{BC}$ indicates the distance between bank B and bank C and $D_{BD}$ indicates the distance between bank B and bank D. As noted, the quantity can be scaled using a scaling factor as discussed, and/or processed in a nonlinear fashion if so desired.

In step 240, the total cost of placing I/O pins of the selected group within each available bank can be determined. In one embodiment, for each bank, the compatibility cost of the bank, the bus proximity cost of the bank, and the interface proximity cost of the bank can be summed. In another embodiment, one or more of the individual costs can be weighted more heavily or less heavily than the others using the respective scaling factors. In another embodiment, a particular cost can be given a weighting of zero so as to be excluded from the total cost calculation. In any case, the total cost can be a combination of any one, two, or all three of the costs discussed herein.

In step 245, the bank with the lowest cost can be selected and I/O pins of the selected group can be assigned to the selected bank. In cases where a bank is selected that does not have a sufficient number of package pins to accommodate the number of I/O pins of the selected group, I/O pins can be selected consecutively. That is, rather than assigning random I/O pins of the group, e.g., pin 1, 5, 9, 10, and 11, pins 1, 2, 3, 4, and 5 can be assigned. In this manner, buses can be split into pin ranges so that more likely than not, related I/O pins will stay close to one another when mapped to package pins.

In step 250, a determination can be made as to whether all of the I/O pins of the selected group have been assigned. If all of the I/O pins of the selected group have been assigned to a bank of the IC, the method can proceed to step 255. If not, the method can continue to step 260.

In step 260, the EDA tool can begin to update the cost of each bank based upon the remaining (unplaced or unassigned) I/O pins within the selected group. The method can loop back to step 225 to continue processing. The compatibility cost, the bus proximity cost, and the interface proximity cost for each available bank can be updated as discussed. In calculating the various costs, however, the costs can be calculated with the selected group having fewer I/O pins, e.g., the number of I/O pin of the last pass minus any I/O pins assigned or placed in step 245.

It should be appreciated that one or more of the costs can be weighted differently from each other cost. The weights further can be varied during different iterations of steps 225-245. In one embodiment, the costs can be weighted such that when more than two banks are available, the bank that is capable of accommodating all of the remaining I/O pins of the selected group may be selected over another bank that, while closer with respect to bus or interface proximity, has too few available package pins to accommodate the I/O pins of the group.

In another example, when two or more banks have sufficient package pins to accommodate the remaining I/O pins of a group, the bank having the least number of available package pins can be selected notwithstanding the other bank having lower bus proximity or interface proximity cost(s). This ensures that the bank with the minimal capacity to accommodate the group will be selected so as not to "waste" package pins.

Continuing to step 255, the EDA tool can determine whether more groups of the circuit design remain to be processed. If so, the method can loop back to step 220, where the largest "unprocessed" group can be selected. If not, the method can proceed to step 265, where the circuit design can be output. The circuit design can specify any I/O pin to bank or I/O pin to package pin assignments that may have been determined.

The flowchart in the figures illustrates the architecture, functionality, and operation of possible implementations of systems, methods, and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. In illustration, each of the costs discussed herein can be determined for a given bank as opposed to the order suggested in the figures. It also should be noted that each block of the flowchart illustration, and combinations of blocks in the flowchart illustration, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, magneto-optical media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, source code, object code, a shared library/dynamic load/link library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of placing input/output (I/O) pins of a circuit design for an integrated circuit (IC), the method comprising:
    selecting a bus from a plurality of buses of the circuit design, wherein the selected bus comprises a plurality of I/O pins and is part of an interface;
    for each of a plurality of banks of the IC, determining a cost of assigning the selected bus to the bank according, at least in part, to a measure of proximity of the bank to at least one other bank comprising a bus of the interface;
    selecting an available bank having a lowest cost from the plurality of banks;
    assigning at least one of the plurality of I/O pins of the selected bus that is not assigned to a bank of the IC to the selected bank; and
    outputting a circuit design comprising an association of at least one I/O pin of the selected bus to the selected bank,
    wherein the selecting a bus, the determining, the selecting an available bank, the assigning, and the outputting are performed by a computer.

2. The computer-implemented method of claim 1, wherein determining the cost comprises calculating a distance between the bank and the at least one other bank comprising a bus of the interface.

3. The computer-implemented method of claim 1, wherein determining the cost comprises determining the cost according, at least in part, to a measure of proximity of the bank to at least one other bank comprising an I/O pin of the selected bus.

4. The computer-implemented method of claim 3, wherein determining the cost comprises calculating a distance between the bank and the at least one other bank comprising an I/O pin of the selected bus.

5. The computer-implemented method of claim 1, wherein determining the cost comprises determining the cost according, at least in part, to a measure of available package pins of the bank compared to unassigned I/O pins of the selected bus.

6. The computer-implemented method of claim 1, wherein a number of available package pins of the selected bank is less than a number of unassigned I/O pins of the selected bus, the method further comprising:
    selecting at least one further bank according, at least in part, to a measure of proximity of the at least one further bank to the selected bank; and
    assigning at least one unassigned I/O pin of the selected bus to the at least one further bank.

7. The computer-implemented method of claim 1, wherein a number of available package pins of the selected bank is less than a number of unassigned I/O pins of the selected bus, the method further comprising:
    selecting at least one further bank having a number of available package pins that is greater than or equal to a number of unassigned I/O pins of the selected bus; and
    assigning at least one unassigned I/O pin of the selected bus to the at least one further bank.

8. The computer-implemented method of claim 1, wherein a number of available package pins of the selected bank is less than a number of unassigned I/O pins of the selected bus, the method further comprising:
    selecting at least one further bank having a smallest number of available package pins that is greater than or equal to a number of unassigned I/O pins of the selected bus; and
    assigning at least one unassigned I/O pin of the selected bus to the at least one further bank.

9. A computer-implemented method of placing input/output (I/O) pins of a circuit design for an integrated circuit (IC), the method comprising:
    selecting a bus from a plurality of buses of the circuit design, wherein the selected bus comprises a plurality of I/O pins and is part of an interface;
    for each of a plurality of banks of the IC, determining a cost of assigning the selected bus to the bank according, at least in part, to a measure of proximity of the bank to at least one other bank comprising an I/O pin of the selected bus;
    selecting an available bank having a lowest cost from the plurality of banks;
    assigning at least one of the plurality of I/O pins of the selected bus that is not assigned to a bank of the IC to the selected bank; and
    outputting a circuit design comprising an association of at least one I/O pin of the selected bus to the selected bank,
    wherein the selecting a bus, the determining, the selecting an available bank, the assigning, and the outputting are performed by a computer.

10. The computer-implemented method of claim 9, wherein determining the cost comprises calculating a distance between the bank and the at least one other bank comprising an I/O pin of the selected bus.

11. The computer-implemented method of claim 9, wherein determining the cost comprises determining the cost according, at least in part, to a measure of proximity of the bank to at least one other bank comprising a bus of the interface.

12. The computer-implemented method of claim 11, wherein determining the cost comprises calculating a distance between the bank and the at least one other bank comprising a bus of the interface.

13. The computer-implemented method of claim 9, wherein determining the cost comprises determining the cost according, at least in part, to a measure of available package pins of the bank compared to unassigned I/O pins of the selected bus.

14. The computer-implemented method of claim 9, wherein a number of available package pins of the selected bank is less than a number of unassigned I/O pins of the selected bus, the method further comprising:
    selecting at least one further bank according, at least in part, to a measure of proximity of the at least one further bank to the selected bank; and
    assigning at least one unassigned I/O pin of the selected bus to the at least one further bank.

15. The computer-implemented method of claim 9, wherein a number of available package pins of the selected bank is less than a number of unassigned I/O pins of the selected bus, the method further comprising:

selecting at least one further bank having a number of available package pins that is greater than or equal to the number of unassigned I/O pins of the selected bus; and assigning at least one unassigned I/O pin of the selected bus to the at least one further bank.

16. The computer-implemented method of claim 9, wherein a number of available package pins of the selected bank is less than a number of unassigned I/O pins of the selected bus, the method further comprising:

selecting at least one further bank having a smallest number of available package pins that is greater than or equal to a number of unassigned I/O pins of the selected bus; and assigning at least one unassigned I/O pin of the selected bus to the at least one further bank.

17. A computer program product, comprising:

a computer-usable medium storing computer-usable program code that places input/output (I/O) pins of a circuit design for an integrated circuit (IC), the computer-usable medium comprising:

computer-usable program code that selects a bus from a plurality of buses of the circuit design, wherein the selected bus comprises a plurality of I/O pins and is part of an interface;

computer-usable program code that, for each of a plurality of banks of the IC, determines a cost of assigning the selected bus to the bank according, at least in part, to at least one of:

a measure of proximity of the bank to at least one other bank comprising a bus of the interface; or a measure of proximity of the bank to at least one other bank comprising an I/O pin of the selected bus;

computer-usable program code that selects an available bank having a lowest cost from the plurality of banks;

computer-usable program code that assigns at least one of the plurality of I/O pins of the selected bus that is not assigned to a bank to the selected bank; and computer-usable program code that outputs a circuit design comprising an association of at least one I/O pin of the selected bus to the selected bank.

18. The computer program product of claim 17, wherein the computer-usable program code that determines the cost comprises computer-usable program code that determines the cost according, at least in part, to a measure of available package pins of the bank compared to unassigned I/O pins of the selected bus.

19. The computer program product of claim 17, wherein a number of available package pins of the selected bank is less than a number of unassigned I/O pins of the selected bus, the computer-usable medium further comprising:

computer-usable program code that selects at least one further bank having a number of available package pins that is greater than or equal to the number of unassigned I/O pins of the selected bus; and computer-usable program code that assigns at least one unassigned I/O pin of the selected bus to the at least one further bank.

20. The computer program product of claim 17, wherein a number of available package pins of the selected bank is less than a number of unassigned I/O pins of the selected bus, the computer-usable medium further comprising:

computer-usable program code that selects at least one further bank having a smallest number of available package pins that is greater than or equal to a number of unassigned I/O pins of the selected bus; and computer-usable program code that assigns at least one unassigned I/O pin of the selected bus to the at least one further bank.

* * * * *